(12) United States Patent
Fan

(10) Patent No.: US 12,642,373 B2
(45) Date of Patent: Jun. 2, 2026

(54) MULTI-ADSORPTION FIXING DEVICE

(71) Applicant: Eagle Fan, Chu-Pel City (TW)

(72) Inventor: Eagle Fan, Chu-Pel City (TW)

( * ) Notice: Subject to any disclaimer, the term of this patent is extended or adjusted under 35 U.S.C. 154(b) by 106 days.

(21) Appl. No.: 18/772,303

(22) Filed: Jul. 15, 2024

(65) Prior Publication Data

US 2025/0160544 A1    May 22, 2025

(30) Foreign Application Priority Data

Nov. 16, 2023    (CN) .......................... 202323088635.5

(51) Int. Cl.
*A47G 1/17* (2006.01)
*F16B 47/00* (2006.01)

(52) U.S. Cl.
CPC ............... *A47G 1/17* (2013.01); *F16B 47/00* (2013.01)

(58) Field of Classification Search
CPC .................................. A47G 1/17; F16B 47/00
USPC ...... 248/467, 683, 537, 205.5, 205.8, 206.2, 248/206.3, 309.3, 362, 363
See application file for complete search history.

(56) References Cited

U.S. PATENT DOCUMENTS 3,159,418  A  *  12/1964  Jphigen ................... H01F 7/206
                                                                335/291
4,121,865  A  *  10/1978  Littwin, Sr. ........... B66C 1/0231
                                                                414/797

| | | | | |
|---|---|---|---|---|
| 5,395,159 | A * | 3/1995 | Pinto ...................... | B60N 2/874 |
| | | | | 248/205.8 |
| 7,066,434 | B2 * | 6/2006 | Kwok ................... | F16B 47/006 |
| | | | | 248/205.8 |
| 7,357,361 | B2 * | 4/2008 | Yen .................... | F16M 11/2064 |
| | | | | 248/205.8 |
| 8,104,809 | B1 * | 1/2012 | Mayhugh .............. | B25B 11/007 |
| | | | | 248/205.8 |
| 8,376,295 | B2 * | 2/2013 | Hao ......................... | F16B 47/00 |
| | | | | 248/205.5 |
| 9,153,152 | B1 * | 10/2015 | Elmer ................... | H01F 7/0221 |
| 9,404,526 | B2 * | 8/2016 | Huang ................... | F16B 47/00 |
| 9,486,111 | B2 * | 11/2016 | Flannery .............. | A47K 17/022 |
| 9,803,682 | B1 * | 10/2017 | Chang .................... | F16B 47/00 |
| 9,950,432 | B1 * | 4/2018 | Huang ................. | B25J 15/0616 |
| 10,641,314 | B1 * | 5/2020 | Fan ........................ | F16B 47/006 |
| 10,753,384 | B1 * | 8/2020 | Chang .................... | F16K 15/14 |
| 11,391,317 | B2 * | 7/2022 | Liu ......................... | F16B 47/00 |

(Continued)

*Primary Examiner* — Muhammad Ijaz
(74) *Attorney, Agent, or Firm* — John D. Tran; Rhema Law Group, P.C.

(57) ABSTRACT

A multi-adsorption fixing device and methods of manufacture can include: providing a shell assembly, the shell assembly comprising a first shell, a second shell, and an elastic member, the second shell being movably connected to the first shell to allow the first shell to move relative to the second shell without being separated, the elastic member provided between the first shell and the second shell; coupling a suction cup assembly to the shell assembly, the suction cup assembly comprising a suction cup body and a release member, the suction cup body being exposed from the second shell, the release member being provided on the first shell, and the release member releasing a vacuum adsorption state of the suction cup body based on the release member being actuated; and providing a magnetic adsorption assembly on the second shell adjacent to the suction cup body.

18 Claims, 11 Drawing Sheets

(56) References Cited

U.S. PATENT DOCUMENTS

| | | | |
|---|---|---|---|
| 11,784,675 B2 * | 10/2023 | Zhang | H04M 1/04 |
| | | | 455/575.1 |
| 11,988,245 B1 * | 5/2024 | Lin | F16B 47/006 |
| 12,385,517 B1 * | 8/2025 | Sun | F16B 47/00 |
| 12,410,832 B1 * | 9/2025 | Yang | F16B 47/00 |
| 12,467,580 B1 * | 11/2025 | Zhi | A61L 9/042 |
| 2007/0075196 A1 * | 4/2007 | Richter | F16B 47/00 |
| | | | 248/205.8 |
| 2008/0023602 A1 * | 1/2008 | Bury | F16B 47/00 |
| | | | 248/205.8 |
| 2008/0054136 A1 * | 3/2008 | Gou | H01Q 1/1207 |
| | | | 248/205.5 |
| 2009/0121102 A1 * | 5/2009 | Woo | G09F 7/12 |
| | | | 248/205.7 |
| 2012/0112023 A1 * | 5/2012 | Tollman | F16B 47/006 |
| | | | 248/205.8 |
| 2012/0147612 A1 * | 6/2012 | Verhoeven | H01F 38/14 |
| | | | 361/679.01 |
| 2014/0353445 A1 * | 12/2014 | Lin | F16B 47/00 |
| | | | 248/205.8 |
| 2015/0314457 A1 * | 11/2015 | Moore | B25J 15/06 |
| | | | 414/800 |
| 2017/0354275 A1 * | 12/2017 | Hatamian | F21V 33/0032 |
| 2020/0329133 A1 * | 10/2020 | Surani | H04M 1/04 |
| 2022/0170503 A1 * | 6/2022 | Bleckat | F16B 47/00 |
| 2023/0146157 A1 * | 5/2023 | Hill | A47G 1/1613 |
| | | | 248/544 |
| 2024/0344656 A1 * | 10/2024 | Jakobuco | B60R 11/0241 |
| 2025/0160544 A1 * | 5/2025 | Fan | A47G 1/17 |

* cited by examiner

MULTI-ADSORPTION FIXING DEVICE

TECHNICAL FIELD

The present invention relates generally to an accessory for electronic devices, and more particularly, to a multi-adsorption fixing device.

BACKGROUND

As portable electronic devices are now an integrated part of people's daily lives, portable electronic devices have become an indispensable tool in the modern world. With different usage environments or places, the use of an intermediate connection device has been developed to fix the electronic device to other fixed devices, such as a hands-free stand. The electronic device is fixed on the windshield of the vehicle or other devices through the hands-free stand, so as to free the user's hands while driving at the same time. Wherein, the suction cup holder is currently the most frequently used product, but there are still the problems, such as, insufficient suction power.

Magnetic stands that fix electronic devices through the magnetic attraction force of magnets are currently widely used by consumers due to convenience. In combination with the development of wireless charging technology, mobile phones with wireless charging functions that can be directly magnetically attached are more popular among many consumers. However, with the increase in usage, the firmness of magnetic adsorption has also been more critical. It seems that the simple magnetic adsorption type can no longer meet such demands, and a practical structure is urgently needed.

SUMMARY

A primary objective of the present invention is to provide a multi-adsorption fixing device that utilizes dual adsorption effects such as magnetic attraction and vacuum suction cup to provide a firm force required for fixation, and due to the floating connection structure, both can achieve a good adsorption effect when used, which satisfies the desire to obtain stable firmness when electronic devices are fixed.

In order to achieve the aforementioned objective, the present invention is a multi-adsorption fixing device, comprising: a shell assembly, further comprising a first shell, a second shell, and a plurality of elastic members, the second shell being movably connected to the first shell to allow the two to move relative to each other without being separated, the plurality of the clastic members being provided between the first shell and the second shell; a suction cup assembly, further comprising: a suction cup body and a release member, the suction cup body being provided on the first shell in an exposed manner and located on the same side as the second shell, the release member being provided on the first shell and able to contact the suction cup body after being actuated and release the suction cup body from a vacuum adsorption state during the contact process; and a magnetic adsorption assembly, provided on the second shell and adjacent to the suction cup body.

In a preferred embodiment, the second shell is annular and connected to the first shell, the suction cup body is fixed on a central area of the first shell, and the magnetic adsorption assembly is fixed inside the second shell and surrounding a periphery of the suction cup body.

In a preferred embodiment, the shell assembly further comprises a partition wall, which is locked to an end surface of the first shell facing the second shell, and the suction cup body has a convex pulling member at the center and the pulling member is fixed on the partition wall.

In a preferred embodiment, the shell assembly further comprises a partition wall, which is locked to an end surface of the first shell facing the second shell, a plurality of guide posts are provided on the second shell in a direction facing the partition wall, the guide posts penetrate the partition wall and are locked, the guide posts can slide on the partition wall and will not separate from the partition wall, so that the second shell moves towards or away from the first shell through the assistance of the plurality of guide posts.

In a preferred embodiment, the shell assembly further comprises a partition wall, which is locked to an end surface of the first shell facing the second shell, a plurality of receiving seats is provided on the partition wall in a direction facing the second shell, a plurality of second receiving seats is provided on the second shell in a direction facing the partition wall, and both ends of each elastic member are respectively fixed on the corresponding first receiving seat and the second receiving seat.

In a preferred embodiment, the second shell is formed with a concave annular groove on an end surface away from the first shell, and the magnetic adsorption assembly is a magnet disposed in the annular groove, the second shell is further provided with a soft pad to seal the annular groove so that the magnetic adsorption assembly is hidden in the second shell.

In a preferred embodiment, the suction cup body further comprises a protruding member, which is located on a top surface of the suction cup body adjacent to edge; the release member is limited to the shell assembly and can only drive the protruding member to move, and the release member has a downward hook; when an external force is applied to move the release member, the hook will contact the protruding member during the movement, and the protruding member drives the edge of the suction cup body to separate from a contact surface to release the vacuum adsorption state.

In a preferred embodiment, the first shell is provided with a window, and the shell assembly further comprises a partition wall, which is locked on an end surface of the first shell facing the second shell, the release member is provided in the window and is restricted to move only in a space between the partition wall and the first shell, the partition wall is further provided with a through opening, and the protruding member is located in a movement path of the hook through the opening.

In a preferred embodiment, the release member further comprises at least one spring, the partition wall has at least one protruding stopper in the direction facing the first shell, at least one guide groove is provided on a bottom of the release member; when the stopper and the spring are both located in the guide groove, the release member is restricted to move only in a space between the partition wall and the first shell, and the release member is controlled by the spring in the absence of external force to push away from the center of the suction cup body.

In a preferred embodiment, an outer wall of the first shell away from the second shell is provided with a connecting portion.

Compared with existing technology, the present invention has the following specific effects:

1. It has dual adsorption effects such as magnetic attraction and vacuum adsorption, providing better firmness when fixing.
2. The second shell is movably connected to the first shell, so that when the suction cup body is pressed down, a good vacuum adsorption state can be obtained. In addition, when the external force disappears, the elastic member is pressed against between the first shell and the second shell, the first shell continues to pull the suction cup body away from the adsorbed contact surface, thereby maintaining a better vacuum adsorption state and obtaining a good fixing effect.

3. Although the suction cup body is arranged on the first shell when not in use, most of the body can also be hidden in the central area of the annular second shell. This can prevent the surface of the suction cup body from being contaminated with dust, which will affect the adsorption effect.

4. The multi-adsorption fixing device of the present invention can be widely used in various connection devices, such as for adsorbing mobile phones, or fixed on the metal surfaces of various devices, meeting the various needs of users.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

The "vacuum adsorption state" referred to in this document is the operation principle of a suction cup. When the suction cup is attached to a surface of an object and when the surrounding pressure (atmospheric pressure) is higher than the pressure between the suction cup and the surface, a lower pressure is generated between the suction cup and the surface, and the lower the pressure, the higher the degree of vacuum and the gripping force of the suction cup becomes stronger, creating a vacuum adsorption state between the suction cup and the surface.

Figure 1:
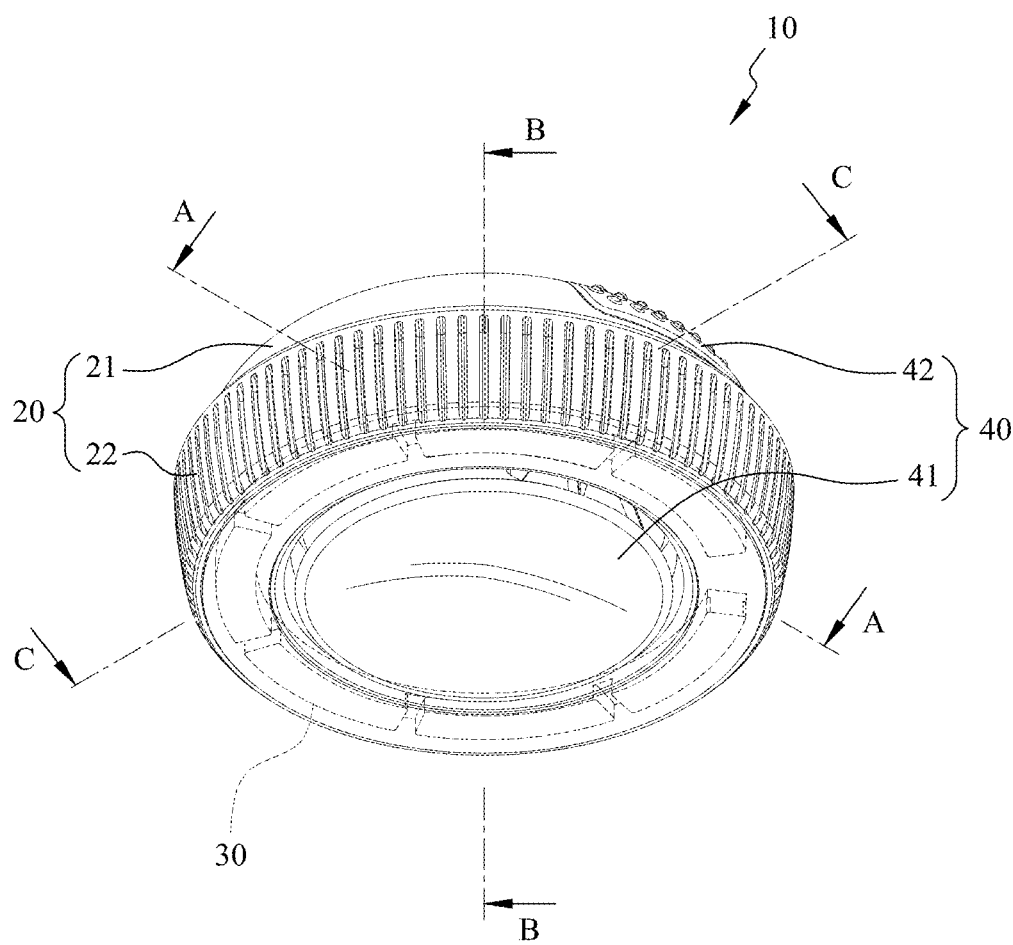
FIG. 1 is a three-dimensional view of the present invention.

FIG. 1 shows a three-dimensional view of the present invention. The multi-adsorption fixing device 10 of the present invention includes a shell assembly 20, a magnetic adsorption assembly 30 and a suction cup assembly 40. The suction cup assembly 40 includes a suction cup body 41 and a release member 42. The suction cup body 41 is installed in an exposed manner on the shell assembly 20, and the suction cup body 41 is used to adsorb to a flat contact surface to form a vacuum adsorption state. The magnetic adsorption assembly 30 is disposed in the shell assembly 20 and adjacent to the suction cup body 41. The magnetic adsorption assembly 30 is magnetically attracted to a metal object with a contact surface. The release member 42 is installed on the shell assembly 20 and is located away from the suction cup body 41. The release member 42 will contact the suction cup body 41 after being actuated, and the vacuum adsorption state between the suction cup body 41 and the contact surface is released during the contact process. The metal object can be the surface of another device, such as a mobile phone, a tablet computer, etc., but is not limited thereto. The fixing device 10 of the present invention has dual adsorption and fixation effects such as magnetic attraction and vacuum suction, and because the shell assembly 20 has a floating structure, the magnetic attraction and vacuum suction can achieve the most appropriate adsorption effect.

When the user operates the fixing device 10 of the present invention, the fixing device 10 is first placed on the contact surface of the metal object, and the magnetic adsorption assembly 30 is magnetically fixed to the contact surface to achieve the magnetic attraction effect first. Then, an external force is applied to the fixing device 10 to lower the position of the suction cup body 41 continuously. During lowering the suction cup body 41, the air between the suction cup body 41 and the contact surface will be expelled, so that the suction cup body 41 is in contact with the contact surface, and a vacuum adsorption state of negative pressure is generated between the suction cup body 41 and the surface, thereby achieving the vacuum adsorption effect secondly. Therefore, in order to achieve such an actuation mode, the shell assembly 20 of the present invention adopts an at least two-piece structure, and two pieces are respectively combined with the magnetic adsorption assembly 30 and the suction cup assembly 40 to meet the requirements of different stages during actuation.

Figure 2:
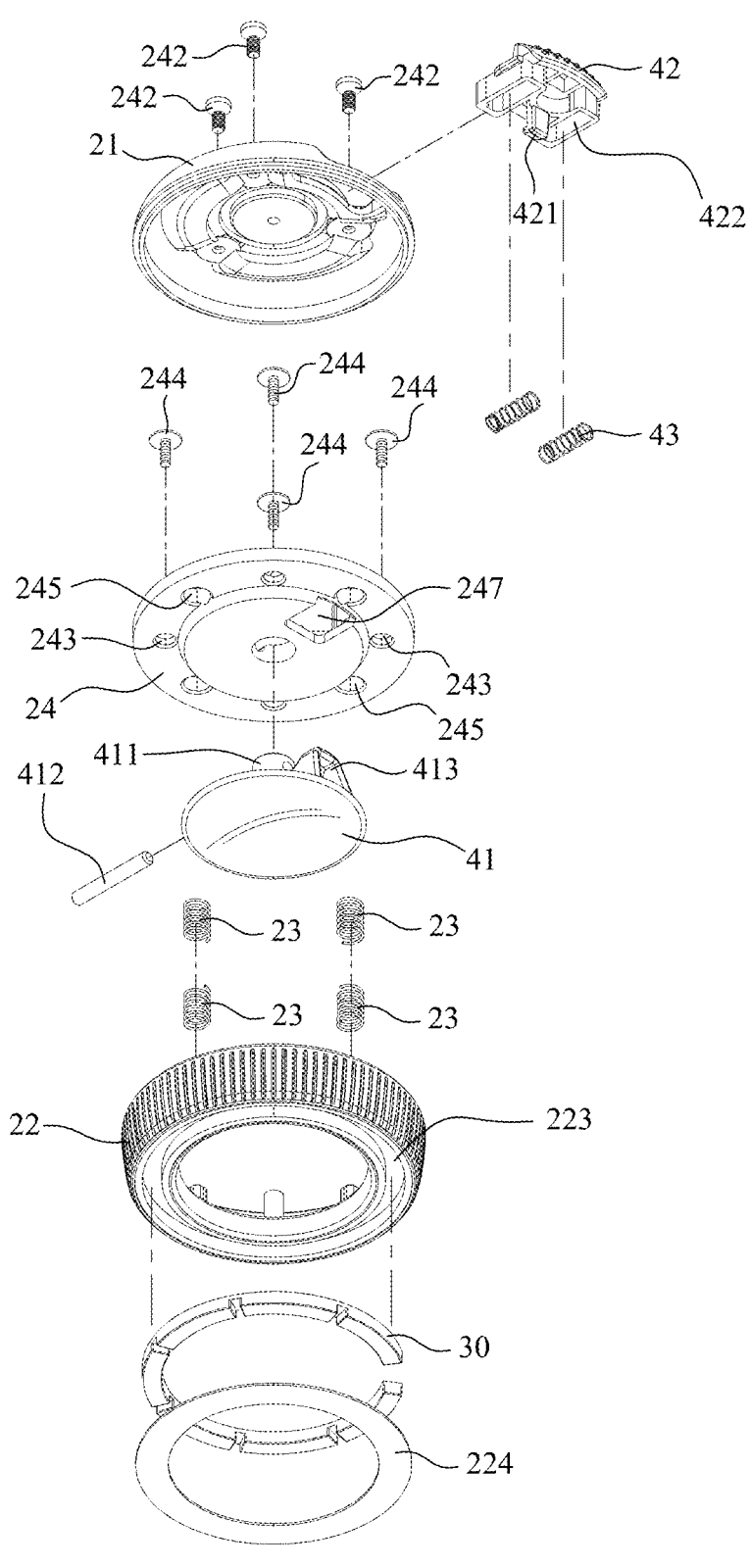
FIG. 2 is an exploded view of the present invention.
Figure 4:
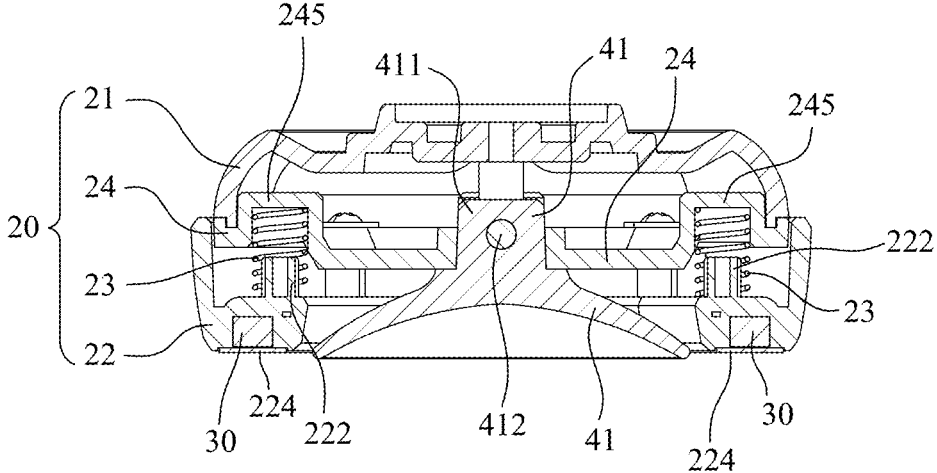
FIG. 4 is a cross-sectional view of plane AA in FIG. 1.

As shown in FIGS. 2 and 4, the shell assembly 20 includes a first shell 21, a second shell 22, and a plurality of elastic members 23. The second shell 22 is movably connected to the first shell 21 to allow relative movement between the two. For example, the second shell 22 can move toward or away from the first shell 21, or the first shell 21 can move toward or away from the second shell 22. However, the two shells will not separate. A plurality of the elastic members 23 are arranged between the first shell 21 and the second shell 22, and the elastic members 23 maximize the distance between the two shells without external force. In the present embodiment, the second shell 22 has an outer diameter larger than that of the first shell 21. The second shell 22 has an annular shape and is connected to the conical arc-shaped first shell 21, wherein the suction cup body 41 is fixed to the central area of the first shell 21, and the magnetic adsorption assembly 30 surrounds the periphery of the suction cup body 41 and is fixed in the second shell 22. As such, when an external force is applied to the first shell 21, the first shell 21 rises downward and drives the suction cup body 41 to fit against the contact surface.

Figure 3:
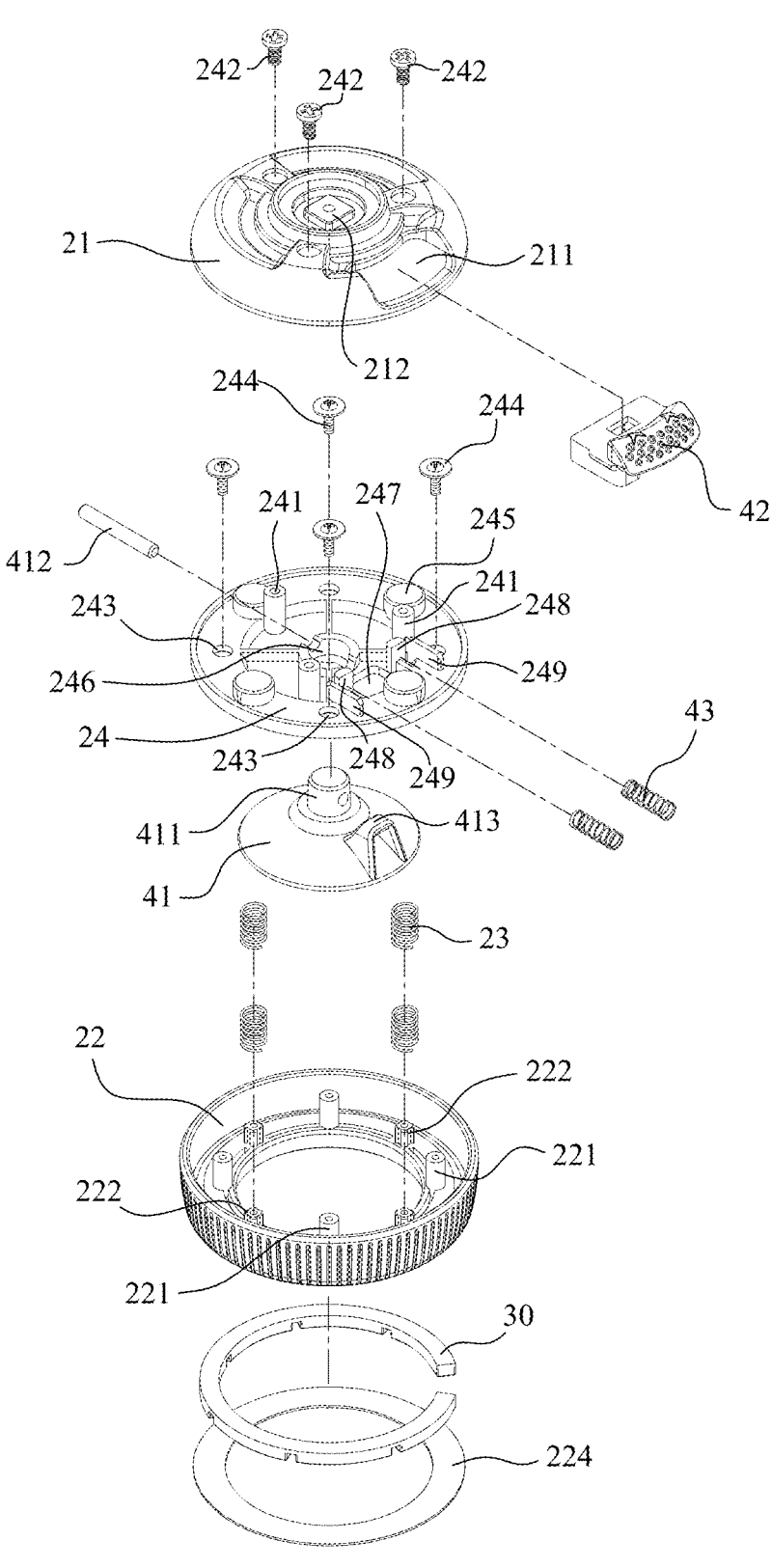
FIG. 3 is an exploded view from another angle of the present invention.

In the present invention, the shell assembly 20 also includes a partition wall 24, which is locked to an end surface of the first shell 21 facing the direction of the second shell 22. As shown in FIG. 3, the partition wall 24 has a plurality of positioning posts 241 toward the direction of the first shell 21, and a plurality of screws 242 are used to partially penetrate the first shell 21 from the outside and be locked to the positioning posts 241, so as to secure the first shell 21 to the partition wall 24, and there is a space between the two, and the space is used to accommodate the release member 42.

In addition, the partition wall 24 has a plurality of recesses first receiving seats 245 facing the second shell 22, and the second shell 22 has a plurality of protruding second receiving seats 222 facing the partition wall 24. The elastic member 23 is a compressible spring. As shown in FIG. 4, the two ends of the elastic member 23 are respectively located inside the corresponding first receiving seat 245 and outside the second receiving seat 222. Although the first shell 21 and the partition wall 24 can be pressed down, when the external force disappears, the elastic member 23 can be used to restore the distance between the first shell 21 and the second shell 22 to the maximum, or make the two maintain appropriate tightness.

Figure 5:
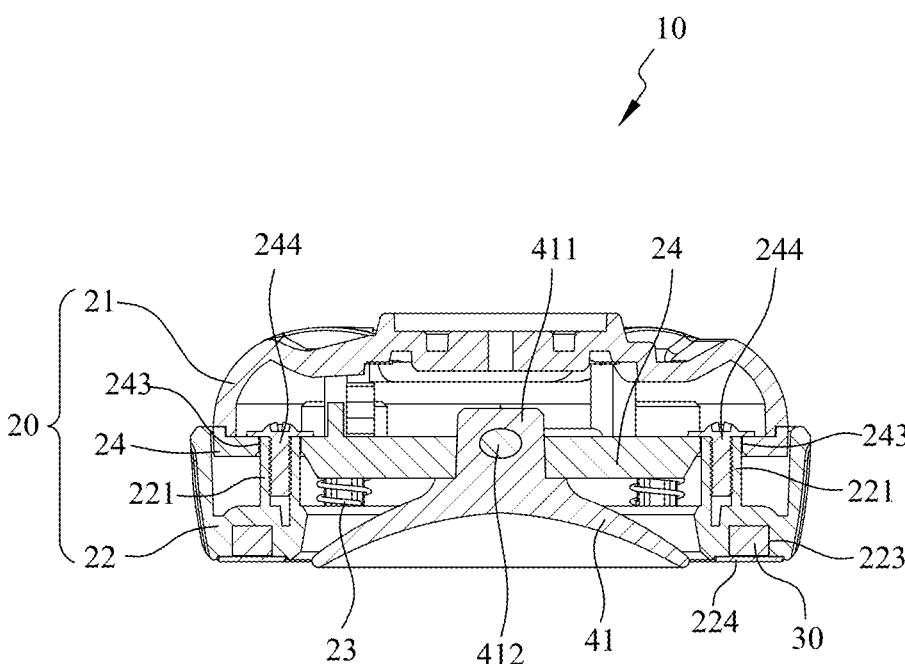
FIG. 5 is a cross-sectional view of the BB plane in FIG. 1.

The following describes how the present invention ensures that the first shell 21 and the second shell 22 can move relative to each other without being separated. As shown in FIGS. 2, 3 and 5, a plurality of guide posts 221 is provided at the second shell 22 facing the direction of the partition wall 24. The guide posts 221 can slide through the partition wall 24 without separation, so that the second shell 22 can move toward or away from the first shell 21 with the assistance of the plurality of guide posts 221. In the present embodiment, there are four guide posts 221 and they are distributed in an equal-angled manner on the second shell 22. The partition wall 24 also has a plurality of guide holes 243, and a plurality of limiting screws 244 are provided and locked to the guide posts 221 above the partition wall 24. Because the diameter of the top of the limiting screw 244 is larger than the guide hole 243, and the diameter of the guide post 221 is smaller than the guide hole 243, therefore, the guide post 221 can move in the guide hole 243 without separation. The second shell 22 can move toward or away from the first shell 21 smoothly by utilizing the guide posts 221 at different positions.

The magnetic adsorption assembly 30 is an object with magnetic attraction force, such as a magnet. The number of the magnets can be plural and are arranged in an annular shape. However, in the present embodiment, the magnetic adsorption assembly 30 is a single magnet resembling a circular ring shape. The second shell 22 is formed with a concave annular groove 223 on the end surface away from the first shell 21. The magnetic adsorption assembly 30 is installed in the annular groove 223. The second shell 22 is also provided with a soft pad. 224. The soft pad 224 is used to seal the annular groove 223 so that the magnetic adsorption assembly 30 is hidden in the second shell 22. The magnetic adsorption assembly 30 is distributed around the periphery of the suction cup body 41.

The suction cup assembly 40 includes the suction cup body 41 and the release member 42. The release member 42 is used to contact and lift up the top surface of the suction cup body 41 near the edge, thereby releasing the vacuum adsorption state. The suction cup body 41 is a conical sheet, which can be made of rubber or other soft materials. The suction cup body 41 has an upwardly protruding pulling member 411 at the center. The pulling member 411 is fixed to the center of the partition wall 24 in the present embodiment, and an assembly hole 246 is provided at the center of the partition wall 24. During assembly, the pulling member 411 protrudes from the partition wall 24 through the assembly hole 246, and then a plug pin 412 penetrates the pulling member 411, and the suction cup body 41 is fixed to the partition wall 24.

Figure 6:
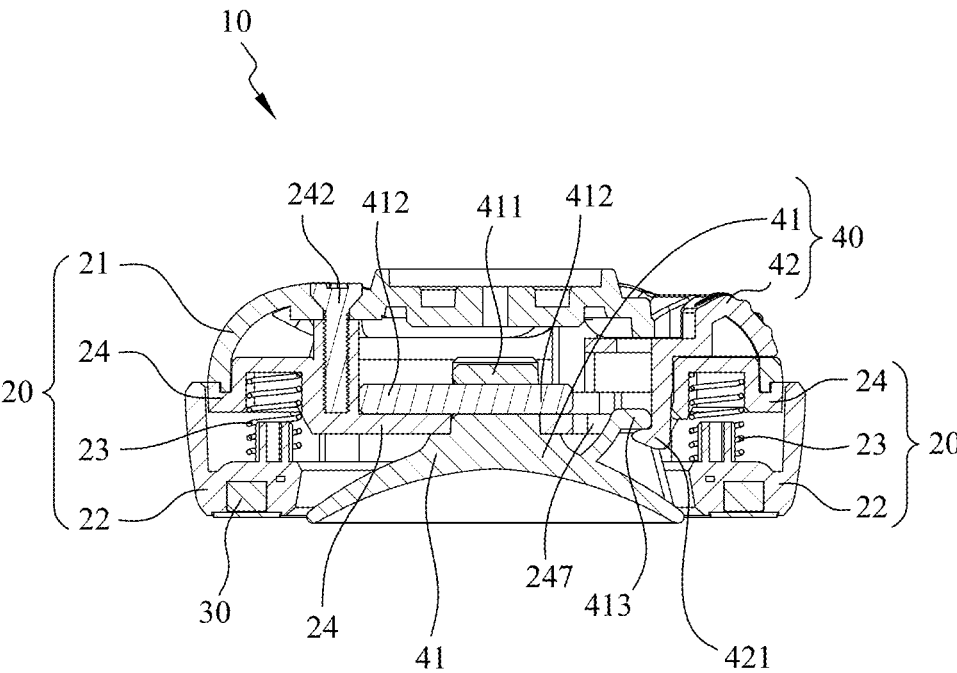
FIG. 6 is a cross-sectional view of the CC plane in FIG. 1.

As shown in FIGS. 3 and 6, the suction cup body 41 has a protruding member 413 on the top surface of the contact edge. In the present embodiment, the protruding member 413 is an inverted U-shaped shell. This shape and position is to match with the release member 42. The partition wall 24 has an opening 247 at a corresponding position, and the protruding member 413 is located in the opening 247 or protrudes from the opening 247. The release member 42 is an object that is limited within the shell assembly 20 and can only drive the protruding member 413 to move. More specifically, the first shell 21 has a window 211, and the release member 42 is configured to be inside the window 211 and restricted to only move within a short distance in the space between the partition wall 24 and the first shell 21. In addition, the release member 42 has a hook 421 facing downward (such as the direction of the suction cup body 41). After assembly, the hook 421 can extend into the opening 247. When an external force is applied to the release member 42 and moves toward the center of the suction cup body 41, that is, toward the pulling member 411, the hook member 421 contacts the protruding member 413 during the movement, thereby driving the edge of the suction cup body 41 to separate from the contact surface to release the vacuum adsorption state. Therefore, the position of the protruding member 413 in the opening 247 must be in the movement path of the hook 421.

To ensure the stability of the release member 42 when moving and its ability to return to its original position after the external force disappears, the suction cup assembly 40 further includes at least one spring 43. The partition wall 24 has at least one upwardly protruding stopper 248 and two guide pieces 249. The distance between the two guide pieces 249 corresponds to the width of the release member 42. As shown in FIGS. 2 and 3, the bottom of the release member 42 is formed with at least one guide groove 422. After assembly, the release member 42 is limited between the two guide pieces 249, and the stopper 248 and the spring 43 are located in the guide groove 422. As such, the release member 42 can only move toward the direction of the center of the suction cup body 41 and will not be separated from the partition wall 24. In the absence of external force, the elasticity of the spring 43 causes the release member 42 to be in the position furthest away from the pulling member 411.

Figure 7:
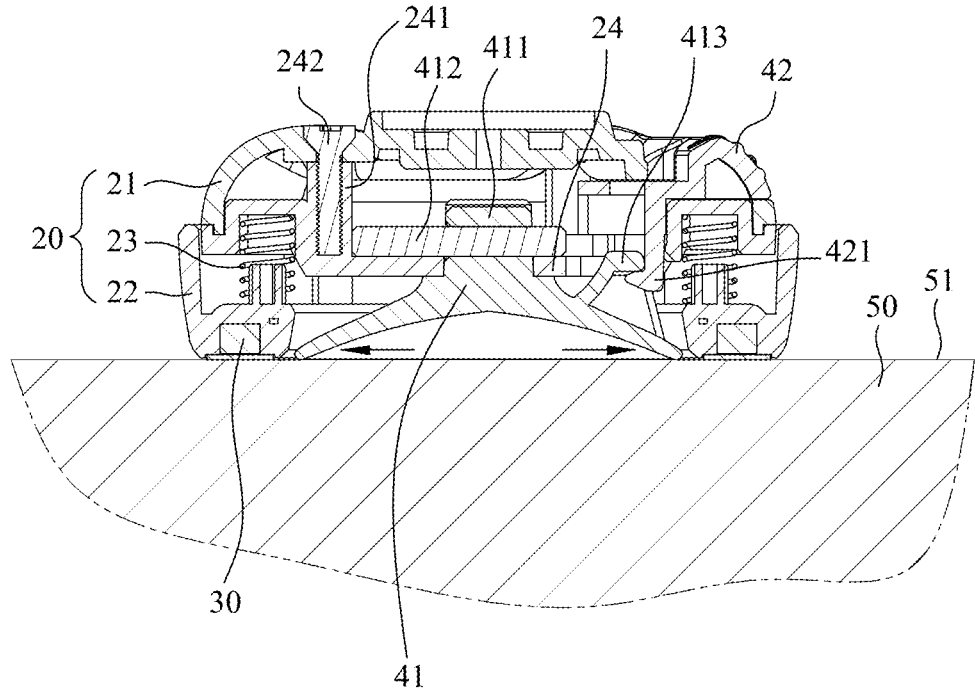
FIG. 7 is a schematic view of the actuation of the magnetic adsorption assembly in the magnetic adsorption state of the present invention.

Next, an explanation will be given on the actual operation of the present invention. As shown in FIG. 7, when the fixing device 10 is used, the fixing device 10 is first placed on a contact surface 51 of a metal object 50. The contact surface 51 is preferably a flat and smooth surface. The magnetic adsorption assembly 30 and the contact surface 51 achieve a preliminary magnetic fixing effect through magnetic attraction.

Figure 8:
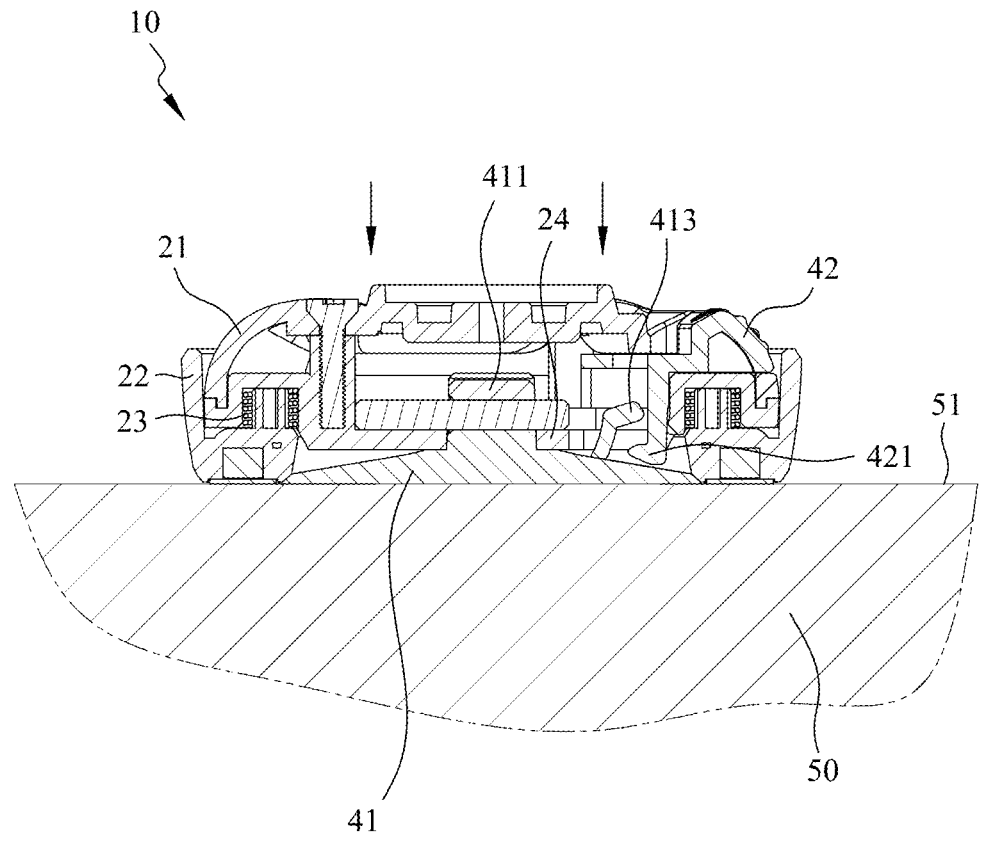
FIG. 8 is a schematic view of the actuation of the vacuum suction state of the suction cup assembly of the present invention.

As shown in FIG. 8, an external force is then applied to the first shell 21, and the partition wall 24 drives the position of the suction cup body 41 to be continuously lowered. During the lowering process, the air in the gap between the suction cup body 41 and the contact surface will be expelled, causing a negative pressure vacuum adsorption state to be established between the suction cup body 41 and the contact surface 51.

Figure 9:
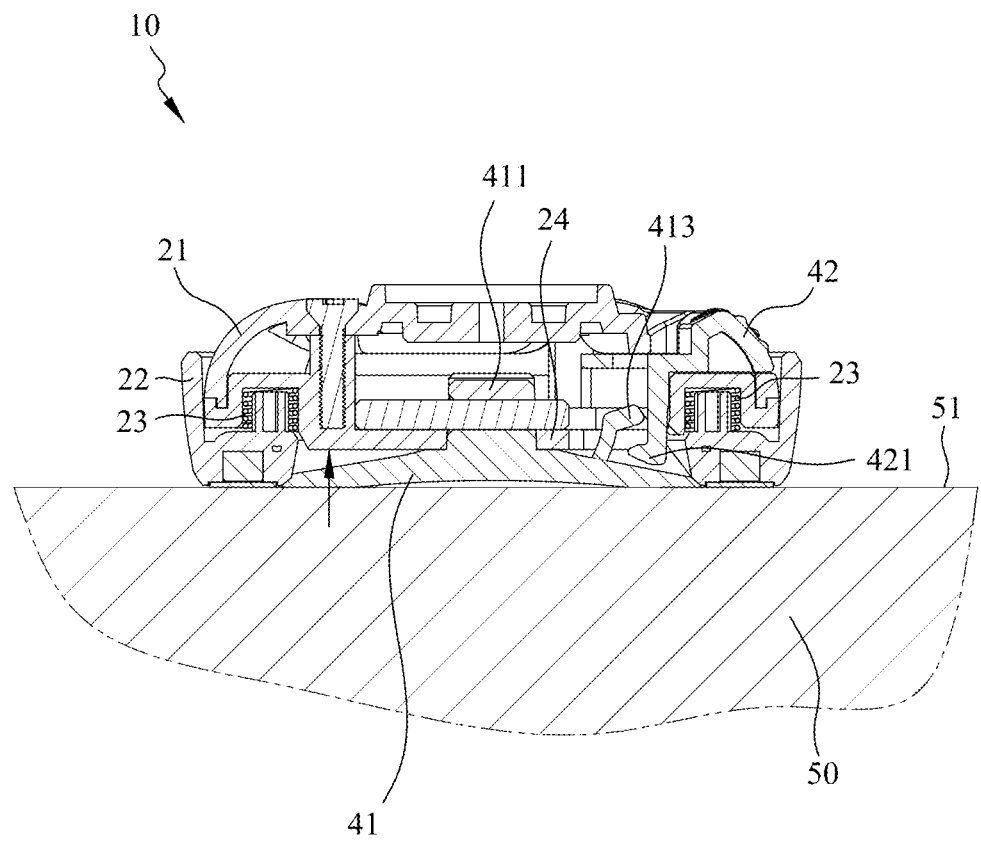
FIG. 9 is a schematic view using elastic members of the present invention to produce a better vacuum adsorption state.

It is worth noting that the present invention that, as shown in FIG. 9, when the external force disappears, the restoring elastic force of the elastic member 23 will push the partition wall 24 to move upward as much as possible, and synchronously drive the pulling member 411 to rise. This will generate a negative pressure vacuum adsorption force between the central area of the suction cup body 41 and the contact surface 51. As shown in the figure, sometimes only a very small gap will be generated in the central area of the suction cup body 41 to ensure and maintain the required vacuum adsorption state. Apparently, this force also has the same effect when the fixing device of other electronic equipment is installed on the top surface of the first shell 21 of the present invention.

Figure 10:
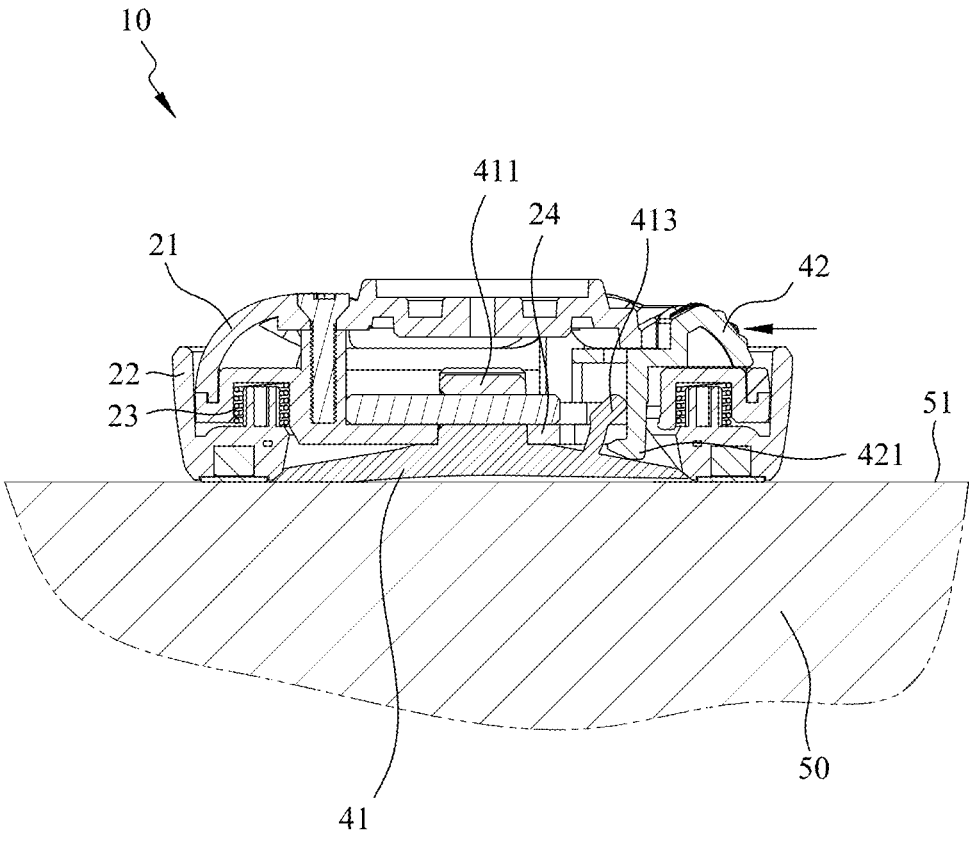
FIG. 10 is a schematic view of the present invention to release the vacuum adsorption state.

As shown in FIG. 10, when the fixing device 10 is to be removed, the vacuum adsorption state must be released first. First, an external force is applied to make the release member 42 move toward the pulling member 411. During the movement, the hook member 421 will contact the protruding member 413. As the protruding member 413 continues to move, the edge of the suction cup body 41 will be driven away. The contact surface 51 allows the outside air to enter the central area of the bottom surface of the suction cup body 41, thereby releasing the vacuum adsorption state. Afterwards, external force is applied to the shell assembly 20 and overcomes the magnetic force of the magnetic adsorption assembly 30, so that the entire fixing device 10 can be removed from the contact surface 51.

Figure 11:
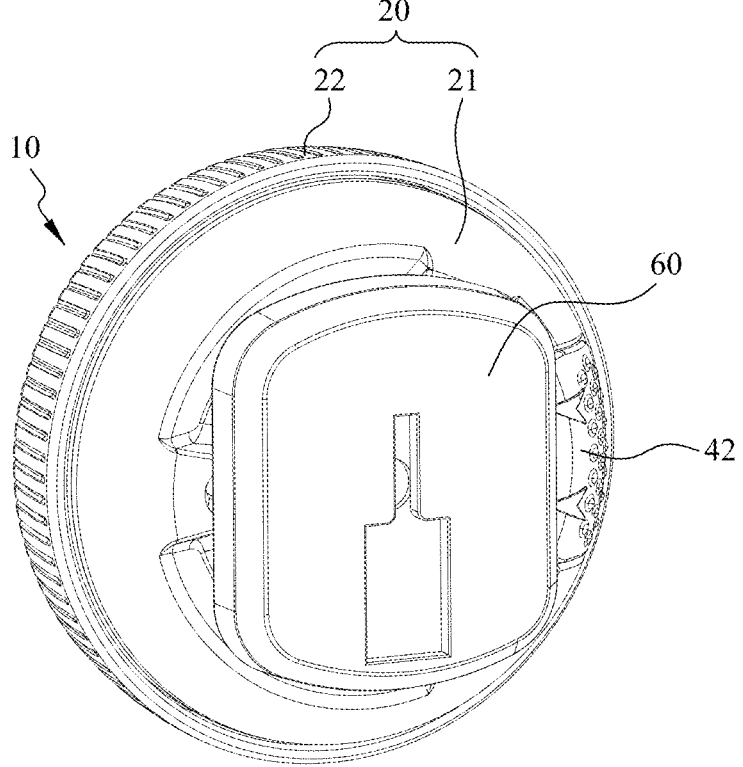
FIG. 11 is a schematic view of the actual product of the present invention.

As shown in FIG. 11, which is a schematic view of the actual product of the present invention, also refer to FIG. 3 as well. The outer wall of the first shell 21 away from the second shell 22 has a connecting portion 212. The connecting portion 212 can be a variety of buckling structures, grooves or shapes. It is used to operate with a docking structure of external device. As shown in FIG. 10, a pair of docking sockets 60 have been disposed here. Through the docking socket 60, the present invention can be installed on the hands-free stand of the mobile phone and for fixing a mobile phone by the fixing device 10 through magnetic adsorption and vacuum suction.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-adsorption fixing device, comprising:
a shell assembly comprising a first shell, a second shell, and an elastic member, the second shell being movably connected to the first shell to allow the first shell to move relative to the second shell without being separated, and the elastic member provided between the first shell and the second shell;
a suction cup assembly comprising a suction cup body and a release member, the suction cup body being exposed from the second shell, and the release member being provided on the first shell, and the release member releasing a vacuum adsorption state of the suction cup body based on the release member being actuated;
a magnetic adsorption assembly provided on the second shell adjacent to the suction cup body; and
wherein:
the second shell is annular and connected to the first shell;
the suction cup body is fixed on a central area of the first shell; and
the magnetic adsorption assembly is fixed inside the second shell and surrounds a periphery of the suction cup body.

2. The multi-adsorption fixing device according to claim 1, wherein:
the shell assembly further comprises a partition wall, and the partition wall is locked to an end surface of the first shell facing the second shell; and
the suction cup body has a convex pulling member at a center of the suction cup body, and the convex pulling member is fixed on the partition wall.

3. The multi-adsorption fixing device according to claim 1, wherein: the shell assembly further comprises a partition wall, the partition wall is locked to an end surface of the first shell facing the second shell, the second shell includes a guide post in a direction facing the partition wall, the guide post penetrates the partition wall, and the guide post slides on the partition wall and will not separate from the partition wall enabling the second shell to move towards or away from the first shell.

4. The multi-adsorption fixing device according to claim 1, wherein: the shell assembly further comprises a partition wall, the partition wall is locked to an end surface of the first shell facing the second shell, the partition wall includes a first receiving seat in a first direction facing the second shell, the second shell includes a second receiving seat in a second direction facing the partition wall, and a first end of the elastic member is fixed on the first receiving seat and a second end of the elastic member is fixed on the second receiving seat.

5. The multi-adsorption fixing device according to claim 1, wherein: the second shell is formed with a concave annular groove on an end surface away from the first shell, the magnetic adsorption assembly is a magnet disposed in the concave annular groove, and the second shell is further provided with a soft pad to seal the concave annular groove concealing the magnetic adsorption assembly in the second shell.

6. The multi-adsorption fixing device according to claim 1, wherein:
the suction cup body further comprises a protruding member, the protruding member is located on a top surface of the suction cup body adjacent to an edge; and
the release member is limited to the shell assembly and only drives the protruding member to move, the release member has a downward hook, and the downward hook contacts the protruding member and releases the vacuum adsorption state based on an external force being applied to the release member.

7. The multi-adsorption fixing device according to claim 6, wherein:

the first shell is provided with a window;

the shell assembly further comprises a partition wall, the partition wall is locked on an end surface of the first shell facing the second shell, and the partition wall includes a through opening;

the release member is provided in the window and is restricted to move only in a space between the partition wall and the first shell; and the protruding member is located in a movement path of the downward hook through the through opening.

8. The multi-adsorption fixing device according to claim 7, wherein:

the partition wall has a protruding stopper in a direction facing the first shell; and the release member further comprises a spring and a guide groove on a bottom of the release member, the release member is restricted to move only in the space between the partition wall and the first shell based on the protruding stopper and the spring being located in the guide groove, and the release member is controlled by the spring in the absence of the external force to push away from a center of the suction cup body.

9. The multi-adsorption fixing device according to claim 1, wherein: the first shell includes an outer wall away from the second shell and is provided with a connecting portion.

10. A method of manufacturing a multi-adsorption fixing device, comprising:

providing a shell assembly, the shell assembly comprising a first shell, a second shell, and an elastic member, the second shell being movably connected to the first shell to allow the first shell to move relative to the second shell without being separated, the elastic member provided between the first shell and the second shell;

coupling a suction cup assembly to the shell assembly, the suction cup assembly comprising a suction cup body and a release member, the suction cup body being exposed from the second shell, the release member being provided on the first shell, and the release member releasing a vacuum adsorption state of the suction cup body based on the release member being actuated;

providing a magnetic adsorption assembly on the second shell adjacent to the suction cup body; and wherein:

providing the shell assembly includes providing the second shell being annular and connecting the second shell to the first shell;

coupling the suction cup assembly includes fixing the suction cup body on a central area of the first shell; and providing the magnetic adsorption assembly includes fixing the magnetic adsorption assembly inside the second shell and surrounding a periphery of the suction cup body.

11. The method according to claim 10, wherein:

providing the shell assembly further comprises providing a partition wall, the partition wall is locked to an end surface of the first shell facing the second shell; and coupling the suction cup body includes coupling the suction cup body having a convex pulling member at a center of the suction cup body and the convex pulling member is fixed on the partition wall.

12. The method according to claim 10, wherein:

providing the shell assembly further comprises providing a partition wall, the partition wall is locked to an end surface of the first shell facing the second shell; and providing the shell assembly further comprises providing a guide post on the second shell in a direction facing the partition wall, the guide post penetrates the partition wall, and the guide post slides on the partition wall and will not separate from the partition wall enabling the second shell to move towards or away from the first shell.

13. The method according to claim 10, wherein: providing the shell assembly further comprises providing a partition wall, the partition wall is locked to an end surface of the first shell facing the second shell, the partition wall includes a first receiving seat in a first direction facing the second shell, the second shell includes a second receiving seat in a second direction facing the partition wall, and a first end of the elastic member is fixed on the first receiving seat and a second end of the elastic member is fixed on the second receiving seat.

14. The method according to claim 10, wherein: providing the shell assembly includes providing the second shell formed with a concave annular groove on an end surface away from the first shell, the magnetic adsorption assembly is a magnet disposed in the concave annular groove, and the second shell is further provided with a soft pad to seal the concave annular groove concealing the magnetic adsorption assembly in the second shell.

15. The method according to claim 10, wherein: coupling the suction cup body further comprises coupling the suction cup body including a protruding member, the protruding member located on a top surface of the suction cup body adjacent to an edge, the release member is limited to the shell assembly and only drives the protruding member to move, the release member has a downward hook, and the downward hook contacts the protruding member and releases the vacuum adsorption state based on an external force being applied to the release member.

16. The method according to claim 15, wherein:

providing the shell assembly includes providing the first shell with a window, and providing a partition wall, the partition wall is locked on an end surface of the first shell facing the second shell, and the partition wall includes a through opening; and coupling the suction cup assembly includes providing the release member in the window and restricted to move only in a space between the partition wall and the first shell, the protruding member is located in a movement path of the downward hook through the through opening.

17. The method according to claim 16, wherein:

providing the shell assembly includes providing the partition wall with a protruding stopper in a direction facing the first shell; and coupling the suction cup assembly includes coupling the suction cup assembly with the release member further comprising a spring and a guide groove on a bottom of the release member, the release member is restricted to move only in the space between the partition wall and the first shell based on the protruding stopper and the spring being located in the guide groove, and the release member is controlled by the spring in the absence of the external force to push away from a center of the suction cup body.

18. The method according to claim 10, wherein: providing the shell assembly includes providing the first shell with an outer wall away from the second shell and provided with a connecting portion.

* * * * *